United States Patent Office 3,008,981
Patented Nov. 14, 1961

3,008,981
PURIFICATION OF ESTERS
Alexander A. Vaitekunas, New Haven, Conn., assignor to Olin Mathieson Chemical Corporation, New Haven, Conn., a corporation of Virginia
No Drawing. Filed Nov. 19, 1959, Ser. No. 854,022
3 Claims. (Cl. 260—475)

This invention relates to the isolation of purified hydroxyethyl esters of phthalic acids from mixtures thereof, and particularly to the preparation of purified bis-(beta-hydroxyethyl) isophthalate and bis-(beta-hydroxyethyl) terephthalate from mixtures containing these esters.

Isophthalic acid and terephthalic acid may be prepared commercially by the oxidation of ortho- and paraxylene, respectively. Although the pure xylenes can be isolated from isomeric mixtures, this has required rather complex and expensive procedures. Likewise, the separation of purified acids from mixtures of isophthalic and terephthalic acid resulting from the oxidation of mixed xylenes requires additional steps and expense. However, one or the other of these intermediate procedures have been considered essential to accomplish the objective of producing a terephthalate or isophthalate monomer suitable for the preparation of commercially useful polyester compositions.

The principal object of this invention has been to provide an efficient process for the separation of hydroxyethyl esters of terephthalic and isophthalic acids from mixtures. Another object has been the provision of such a process whereby the desired purification may be accomplished without requiring a complex sequence of operations. A further object has been to provide such a process using an organic solvent displaying highly selective solvent action with respect to the bis-(beta-hydroxyethyl) esters of terephthalic and isophthalic acids.

It has now been found that methylene chloride is unique among common organic solvents in displaying much higher solvent power for the isophthalic acid ester than for the terephthalate. In accordance with this invention, therefore, the separation and purification of the esters is accomplished with the use of methylene chloride.

While the isophthalate ester is generally more soluble in the common organic solvents than the terephthalate at a given temperature, as shown in the following table, the solubility of the isophthalate is generally less than ten times that of the terephthalate. Methylene chloride appears unique, however, in displaying one-hundred times or more greater solvent power for the isophthalate.

TABLE 1

| Solvent | Temperature | Solubility in g. per 100 g. of solvent at 20° C. | |
|---|---|---|---|
| | | Terephthalate | Isophthalate |
| Benzene | 20° C. | 0.1 | 1.14 |
| Do | Boiling point | 2.3 | 7.5 |
| Ethyl ether | 20° C. | <0.05 | 0.55 |
| Do | Boiling point | 3.5 | 4.1 |
| Methylene chloride | 20° C. | 0.6 | 80 |
| Do | Boiling point | 1.2 | 120 |

The process of this invention therefore accomplishes the desired purification based on the high and selective solvent power of methylene chloride for the isophthalate.

Generally, the separation of the esters is effected by contacting the mixture with at least sufficient methylene chloride solvent to dissolve the isophthalate present, and separating the resulting solution from the terephthalate by filtration or other convenient method such as decantation or centrifuging. Likewise, when the esters are obtained in the form of an aqueous solution, the isophthalate can readily be separated by extracting the solution with methylene chloride solvent.

In accordance with preferred practice embodying the invention, the mixture of esters is thoroughly contacted with about five to thirty times its weight, preferably about ten, of methylene chloride solvent at a temperature of about 0° to 25° C., preferably at 5° to 10° C. On thorough agitation or trituration of the resulting mixture, substantially all the isophthalate is dissolved in the solvent.

The solution is separated from the undissolved residue by filtration or other suitable means, such as centrifuging.

The undissolved ester consists of bis-(beta-hydroxyethyl) terephthalate of sufficiently high purity (98–100%) to meet many commercial requirements. Further purification is readily effected by washing the material with methylene chloride, for example two to five volumes, and crystallizing from water solution. For example, the terephthalate is dissolved in five times its weight of distilled water at a temperature above 55° C., the solution is filtered hot, and crystallized at a temperature of 0° to 25° C. The resulting product consists of pure white crystals having a melting point of 110.4° C. and characterized by analytical values very close to the theoretical. The product may readily be polymerized to substantially colorless polyethylene terephthalate having an intrinsic viscosity of 0.65 and readily convertible to strong fibers and film of high clarity and strength. Polymerization may be accomplished, for example, by heating the purified ester in the presence of 0.05% of its weight of zinc acetate dihydrate for four hours at 275° C. in an atmosphere of nitrogen at a reduced pressure of about 0.4 mm. of mercury.

The removal of methylene chloride solvent by evaporation from the solution of ester yields a residue of bis-(beta-hydroxyethyl) isophthalate of sufficient purity (87–95%) for many commercial uses. Higher purity (95–99.3%) is attained when only part of the solvent is removed, and the resulting crystals are separated from the solution, such practice being preferred. Further purification may be effected by dissolving the ester to form a substantially saturated solution in methylene chloride solvent at about its boiling point, filtering the solution while hot, and cooling to about 0° to 20° C. The product is obtained as white crystals, having a melting point of 78.6° C., displaying analytical values very close to the theoretical, and readily converted to substantially colorless polyester of desirable properties.

The following tables list illustrative results obtained in accordance with the above described procedure, without recrystallization of the initially separated ester products.

TABLE 2

| Example | Initial mixture | | | Methylene chloride, Parts by weight |
|---|---|---|---|---|
| | Percent T. ester | Percent I. ester | Parts by Wt. | |
| 1 | 5.0 | 95.0 | 22.0 | 100 |
| 2 | 5.4 | 94.6 | 55.0 | 500 |
| 3 | 30.0 | 70.0 | 33.0 | 200 |
| 4 | 50.0 | 50.0 | 10.0 | 300 |

TABLE 3

*Recovered bis-(beta-hydroxyethyl) esters*

| Example | Terephthalate | | Isophthalate | |
|---|---|---|---|---|
| | Parts by weight | Purity,[1] percent | Parts by weight | Purity,[1] percent |
| 1 | 1.0 | 98 | 20.0 | 95 |
| 2 | 2.0 | 100 | 47.3 | 99.3 |
| 3 | 9.9 | 98.1 | 22.0 | 98 |
| 4 | 4.7 | 100 | 5.2 | 95 |

[1] Polarographic and X-ray analyses.

While it is generally preferable to use methylene chloride ($CH_2Cl_2$) that is substantially pure in the separation process in accordance with this invention, it will be understood that advantageous results are likewise obtainable with the use of methylene chloride solvent containing up to about 15% by weight of one or more common organic solvents. For example, the methylene chloride solvent may include small proportions of benzene, toluene, ethyl ether, methyl or ethyl alcohol, acetone, ethyl acetate, or dioxane, being characterized by the desired high solvent power and selectivity for the isophthalate.

It will further be understood that the initial mixture containing the bis-(beta-hydroxyethyl) esters of terephthalic and isophthalic acids may consist of the reaction product resulting from the esterification of the acids obtained by the oxidation of isomeric mixtures of xylenes. Such oxidation product, while consisting mainly of terephthalic and isophthalic acids, generally contain orthophthalic acid and some monobasic acids such as benzoic and toluic acids. The esterification may be accomplished by the use of ethylene oxide in the presence of a catalyst and an organic medium or in the presence of an aqueous medium, as disclosed in British Patent 623,669. A further advantage of the procedure in accordance with this invention is that the esters of such acids, including orthophthalic and monobasic acids, present in small percentages in the initial mixture, do not appear in any substantial amount in the desired terephthalate and isophthalate ester products.

What is claimed is:

1. In the preparation of bis-(hydroxyethyl) esters of isophthalic and terephthalic acids from a mixture thereof, the process comprising contacting the said mixture with a selective liquid solvent for the isophthalate to form a solution thereof, said solvent containing at least about 85% by weight of methylene chloride, isolating the terephthalate ester in the portion of said mixture not dissolved by said solvent, and separating the isophthalate ester from said solution.

2. A process in accordance with claim 1, wherein about 5 to 30 parts by weight of said solvent are employed per part by weight of said mixture.

3. A process in accordance with claim 1, wherein said solvent is at a temperature of about 5° to 10° C.

References Cited in the file of this patent

UNITED STATES PATENTS 2,656,377    Pino ------------------ Oct. 20, 1953

OTHER REFERENCES

Jordan: "Technology of Solvents," pages 214–15 (1937).